US009346165B1

(12) United States Patent
Metzger et al.

(10) Patent No.: US 9,346,165 B1
(45) Date of Patent: May 24, 2016

(54) ROBOTIC DEVICES WITH MULTI-DEGREE OF FREEDOM (DOF) LOAD CELL FOR SHEAR BEAM SENSING

(71) Applicant: Google Inc., Mountain View, CA (US)

(72) Inventors: Andy Metzger, Oakland, CA (US); Lee Magnusson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 23 days.

(21) Appl. No.: 14/293,065

(22) Filed: Jun. 2, 2014

(51) Int. Cl.
G05B 19/04 (2006.01)
G05B 19/18 (2006.01)
B25J 9/16 (2006.01)

(52) U.S. Cl.
CPC .................... B25J 9/1674 (2013.01)

(58) Field of Classification Search
CPC ............ B25J 9/1674; B25J 9/00; B25J 19/02; G06F 19/00; G05B 19/00
USPC .......... 700/245, 255, 260, 261; 901/2, 28, 46; 318/568.11, 568.12, 568.16
See application file for complete search history.

(56) References Cited

U.S. PATENT DOCUMENTS

| 4,521,685 | A | * | 6/1985 | Rebman | A61B 5/16 250/229 |
| 5,604,314 | A | | 2/1997 | Grahn | |
| 7,357,035 | B2 | | 4/2008 | Liu et al. | |
| 7,437,954 | B2 | | 10/2008 | Sakano | |
| 7,878,075 | B2 | * | 2/2011 | Johansson | B25J 13/084 73/862.046 |
| 8,265,792 | B2 | * | 9/2012 | Wampler, II | B25J 9/1692 700/254 |
| 8,483,877 | B2 | * | 7/2013 | Abdallah | B25J 9/1633 700/255 |
| 2010/0234999 | A1 | * | 9/2010 | Nakajima | B25J 9/1628 700/261 |
| 2011/0193363 | A1 | * | 8/2011 | Nishiwaki | B25J 13/083 294/86.4 |
| 2011/0257784 | A1 | * | 10/2011 | Wampler, II | B25J 9/1692 700/254 |
| 2012/0059515 | A1 | * | 3/2012 | Abdallah | B25J 9/1633 700/255 |
| 2013/0159940 | A1 | | 6/2013 | Duffy et al. | |
| 2013/0233116 | A1 | | 9/2013 | Rose et al. | |
| 2013/0300537 | A1 | * | 11/2013 | Bajo | B25J 9/163 340/8.1 |
| 2014/0053653 | A1 | * | 2/2014 | McCollum | B25J 11/00 73/788 |

OTHER PUBLICATIONS

DeLuca et al. "Collision Detection and Safe Reaction with the DLR-III Lightweight Manipulator Arm", Proceedings of the 2006 IEEE/RSJ, International Conference on Intelligent Robots and Systems, Oct. 9-15, 2008, Beijing, China, p. 1623-1630.
Design and Development: TakkTile Sensor Gives Robots Softer Touch at Lower Cost, retrieved on Apr. 29, 2014 from http://www.roboticstrends.com/design_development/article/takkile_sensor_gives_robots_softer_touch_at_lower_costs/.

* cited by examiner

Primary Examiner — Jaime Figueroa
(74) Attorney, Agent, or Firm — McDonnell Boehnen Hulbert & Berghoff LLP

(57) ABSTRACT

Robotic devices with multi-degree of freedom (DOF) load cells for shear beam sensing are described. An example robotic device includes actuators coupled through joints to form a robotic manipulator, and a load cell provided proximal to a joint for detecting a force applied to the robotic manipulator and a torque experienced about the joint. The device also includes a controller programmable to determine a location of the force along the robotic manipulator based on values of the force and the torque output from the load cell, receive information indicating parameters of the robotic manipulator and of a load being experienced by the robotic device, and based on one of the force applied to the robotic manipulator or the torque experienced about the joint being above a threshold expected amount due to the load being experienced, determine that the robotic manipulator is experiencing an unexpected shear load at the location.

17 Claims, 6 Drawing Sheets

ROBOTIC DEVICES WITH MULTI-DEGREE OF FREEDOM (DOF) LOAD CELL FOR SHEAR BEAM SENSING

BACKGROUND

Unless otherwise indicated herein, the materials described in this section are not prior art to the claims in this application and are not admitted to be prior art by inclusion in this section.

Safety issues are a concern for robotic devices that operate in an unstructured environment, and share workspaces with human users and other objects. Contact by the robotic devices with other objects may be avoided by anticipating when and where such contact may occur.

Many robotic devices include compliant components that may allow for external contact with objects, and allow for deviations from an equilibrium position depending on the applied external force. An equilibrium position of a compliant component may be a position where the component generates zero force or zero torque. Some examples of compliant components include passive compliant actuators that contain an elastic element, such as a spring, that can store energy. Such an example passive compliant component includes a series elastic actuator SEA, which is a spring in series with a stiff actuator. Compliance of the actuator is fixed and is determined by selection of the spring. To obtain variable stiffness, a virtual stiffness of the actuator can be adjusted by dynamically adjusting the equilibrium position of the spring, for example.

In contrast, other robotic devices may include non-compliant components, in which a component is a stiff component and is able to move to a specific position or to track a predefined trajectory. Once a position is reached, the non-compliant component typically remains at that position despite any external forces exerted on the component (within force limits of the device, for example).

Other example robotic devices may be operated in ways that include motion planning or other control strategies for minimizing contact with objects. Such robotic devices may include sensors and controllers that operate according to algorithms to precisely control motion of components of the robotic device in predictable manners.

SUMMARY

In one example, a robotic device is provided that comprises one or more actuators coupled through one or more joints to form a robotic manipulator, and a shear beam sensing load cell provided proximal to a given joint of the one or more joints for detecting a force applied to the robotic manipulator and a torque experienced about the given joint. The robotic device also comprises a controller programmable to determine a location of the detected force along the robotic manipulator based on values of the force and the torque output from the shear beam sensing load cell, receive information indicating parameters of the robotic manipulator and of a load being experienced by the robotic device, and based on one of the force applied to the robotic manipulator or the torque experienced about the given joint being above a threshold expected amount due to the load being experienced, determine that the robotic manipulator is experiencing an unexpected shear load at the location.

In another example, a robotic device is provided that comprises a first actuator coupled to a second actuator through a joint to form a robotic manipulator, a load cell provided at the joint for detecting a force applied to the robotic manipulator and a torque experienced about the joint, a sensor to determine an angle between the first actuator and the second actuator, and a controller. The controller is programmable to determine a location of the detected force along the robotic manipulator based on values of the force and the torque output from the load cell, and determine a direction of the detected force applied to the robotic manipulator based on the angle between the first actuator and the second actuator.

In another example, a method is provided that comprises receiving information indicating a torque experienced about a joint coupling a first actuator to a second actuator to form a robotic manipulator of a robotic device, and information indicating a force applied to the robotic manipulator. The method also comprises determining a location of the force along the robotic manipulator based on received values of the force and the torque, and based on one of the force applied to the robotic manipulator or the torque experienced about the joint being above a threshold expected amount due to a load being experienced by the robotic device, determining that the robotic manipulator is experiencing an unexpected shear load at the location. The method further comprises causing the robotic device to perform a safety function based on the determination of the unexpected shear load and on the location of the force.

In another example, a system is provided that comprises a means for receiving information indicating a torque experienced about a joint coupling a first actuator to a second actuator to form a robotic manipulator of a robotic device, and information indicating a force applied to the robotic manipulator. The system also comprises a means for determining a location of the force along the robotic manipulator based on received values of the force and the torque. The system also comprises a means for determining that the robotic manipulator is experiencing an unexpected shear load at the location based on one of the force applied to the robotic manipulator or the torque experienced about the joint being above a threshold expected amount due to a load being experienced by the robotic device. The system further comprises a means for causing the robotic device to perform a safety function based on the determination of the unexpected shear load and on the location of the force.

In still other examples, methods and computer program products including instructions executable by a device, or by one or more processors or other components of the device, to perform functions of the methods are provided. The methods may be executable for operating a robotic device, for example.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, with tactile sensing, robotic devices may be expected to work more autonomously and be more responsive to unexpected contacts by detecting contact forces (or pressures) and locations of the detected forces during activities such as manipulation and assembly. However, torque control of robotic manipulators or links (e.g., arms) may have limited safety when contact forces are present close to a point of rotation. For example, a torque sensing load cell that includes strain gauges to sense a deformation due to an applied force, is usually not deployed at multiple areas along an entire surface of the link. A load cell that is positioned on an end of a link may sense force or torque in three directions, but if contact is away from the load cell, sensing can be distorted.

With this in mind, within examples herein, a shear beam sensing load cell may be used to detect forces anywhere along the link. A force applied anywhere along the link (e.g., beam) from an elbow to a hand of a robotic arm can be detected and determined. Information output by the shear beam sensing load cell can be used to determine where along the beam that the force was applied.

Example load cells may include a multi-axis load cell that includes strain gauges on multiple surfaces to sense forces along multiple axes. Urethane (or other rubber, plastic, epoxy material) may be included surrounding the load cell to enable an applied force to be sensed by the strain gauges.

Figure 1:
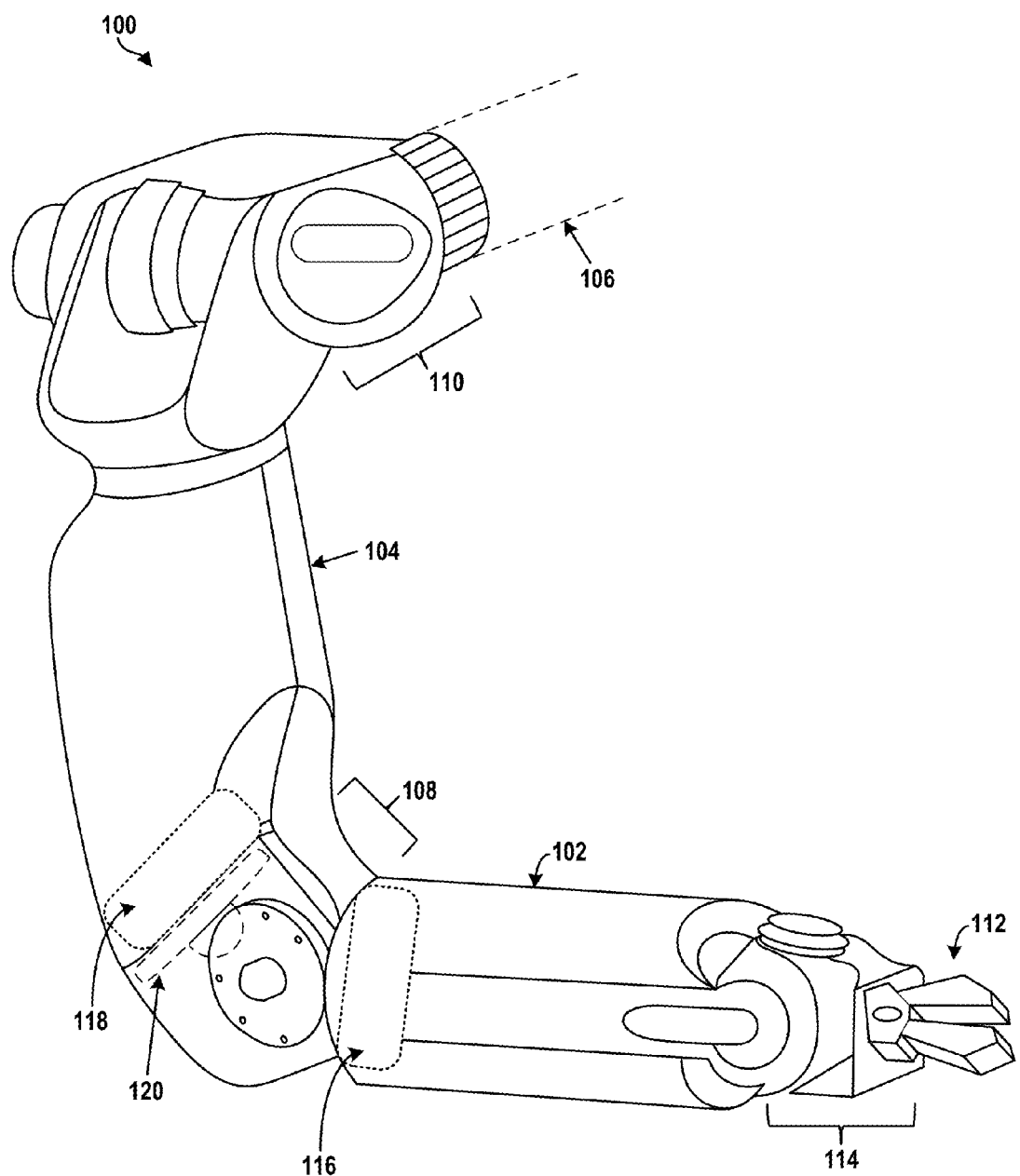
FIG. 1 illustrates an example robotic device in a form of a robotic manipulator that includes actuators coupled through joints.

Referring now to the figures, FIG. 1 illustrates an example robotic device 100 in a form of a robotic manipulator that includes actuators 102, 104, and 106 coupled through joints 108 and 110. The robotic device 100 further includes an end-of-arm tool (EOAT) 112 coupled to the actuator 102 through a joint 114.

Within examples, the actuators 102, 104, and 106 may include a torque controlled actuator that has an electric motor attached to a transmission, and the transmission may include an N-stage belt transmission arranged in a serial fashion that connects rotation of the motor to rotation of an output. Each stage of the transmission may include a timing belt, a belt tensioning mechanism, and a tension measuring system, for example. Other types of actuators may also be used as well, and any number of actuators may be coupled together to form the robotic device 100.

The robotic device 100 also includes a load cell 116 provided proximal the joint 108 for detecting a force applied to the robotic manipulator and a torque experienced about the joint 108, for example. The load cell 116 may be internal to the actuator 102 and coupled between the actuator 102 and the joint 108, provided on the actuator 102, or provided on the joint 108. The load cell 116 may further be a component internal of the joint 108. The load cell 116 may include a transducer to detect and convert an applied force to the robotic manipulator into an electrical signal. For example, a force being sensed deforms a strain gauge of the load cell 116, and the strain gauge measures the deformation (strain) as an electrical signal because the strain changes an effective electrical resistance of the gauge. The load cell 116 may include four strain gauges in a Wheatstone bridge configuration, one strain gauge in a quarter-bridge configuration, or two strain gauges in a half-bridge configuration. The electrical signal output may be in the order of a few millivolts and may be amplified as well.

In some examples, the robotic device 100 may include another load cell 118 provided proximal to the joint 108 and on a side of the joint 108 opposite the position of the load cell 116, as a second load cell in the device, or rather than having the load cell 116. The load cell 118 may be provided into the actuator 104 and coupled between the actuator 104 and the joint 108, provided on the actuator 104, or provided on the joint 108. The load cell 118 may further be a component internal of the joint 108. The robotic device 100 may include any number of load cells provided proximal to any number of joints, for example.

The robotic device 100 may further include or be operated by a controller (not shown in FIG. 1) that is programmable to receive outputs from the load cell 116 and/or load cell 118 that indicate values of forces and torques output from the load cells, and to determine a location of a detected force along the robotic manipulator based on the values of the force and the torque output from the load cell. The controller may further receive information indicating parameters of the robotic manipulator and of a load being experienced by the robotic device, and based on one of the force applied to the robotic manipulator or the torque experienced about the given joint being above a threshold expected amount due to the load being experienced, determine that the robotic manipulator is experiencing an unexpected shear load at the location.

The robotic device 100 may also include a sensor 120 to determine an angle between actuators, such as an angle between the actuator 102 and the actuator 104. The sensor 120 may be a rotary encoder configured to determine an angle between the actuator 102 and the actuator 104 based on movement of the two actuators relative to each other. In another example, the sensor 120 may be multi-disc sensor with slots such that movement of the actuators relative to each other causes a disc to rotate relative to another disc, and slots on the discs may be indicative of the angle between the two actuators that can be read by a detector, for example. The controller may be further programmable to determine a direction of the detected force applied to the robotic manipulator based on the angle between the first actuator and the second actuator.

Thus, the controller may be electronically connected or in communication with the load cells 116 and 118, and the sensor 120, to receive outputs from the load cells 116 and 118 and the sensor 120, and to make determinations of detected forces and locations of detected forces along the robotic manipulator, for example.

The robotic device 100 in FIG. 1 includes multiple actuators coupled through joints to form a robotic manipulator, such as an arm of a robot. However, the robotic device 100 may take other forms, and any combination of actuators coupled together through joints may be provided. Load cells may be provided at all joints of the robotic device 100, or at selected joints such as an elbow joint, for example. In one specific example, the robotic device includes a first actuator coupled to a second actuator through a joint to form a robotic manipulator, and a load cell is provided at the joint for detecting a force applied to the robotic manipulator and a torque experienced about the joint.

Figure 2A:
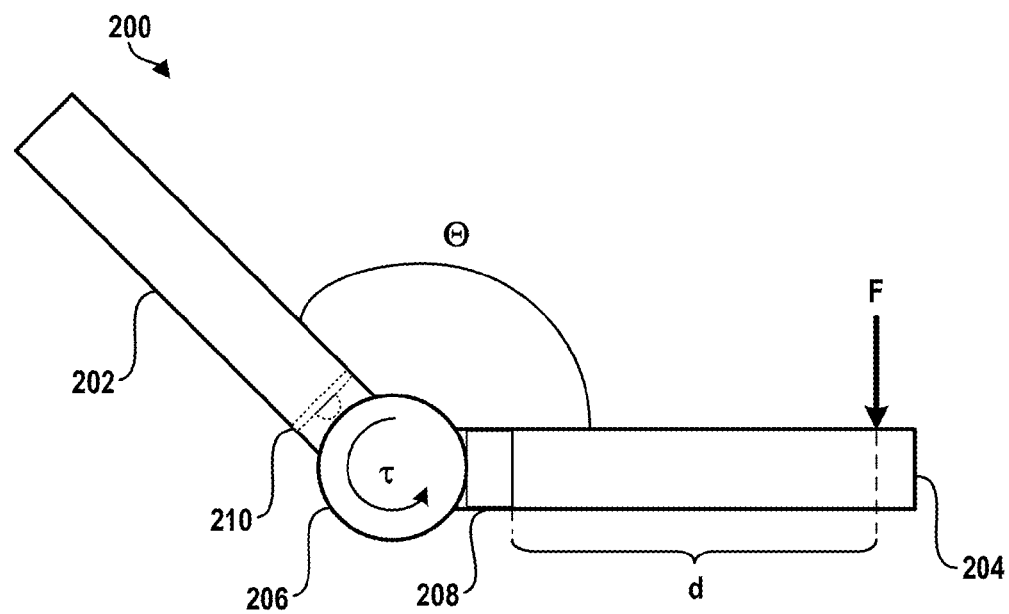
FIGS. 2A-2C illustrate examples of force sensing proximal to a joint of multiple actuators of a robotic device.

FIG. 2A illustrates an example of force sensing proximal to a joint of multiple actuators of a robotic device 200. The robotic device 200 includes an actuator 202 coupled to another actuator 204 through a joint 206. A load cell 208 is provided proximal to the joint 206, such as between the joint 206 and the actuator 204, for example. In this example, the robotic device 200 may be in the form of a robotic arm, and the joint 206 may be an elbow. The load cell 208 may be provided where the forearm connects to the elbow. The load cell 208 may be configured to detect a force (F) applied to the actuator 204. The load cell 208 may output values of the force (F) applied to the actuator along all three Cartesian coordinate axes X, Y, and Z (e.g. $F_x$, $F_y$, $F_z$). The load cell 208 may also be configured to output values of torque ($\tau$) (or a moment) experienced by the joint 206 along all three Cartesian coordinate axes X, Y, and Z ($\tau_x$, $\tau_y$, $\tau_z$).

Thus, when a force is experienced on the actuator 204, the load cell 208 may provide outputs of values indicative of both the value of the force, and also of the value of the torque at the joint 206. Because the load cell 208 is provided proximal to the joint 206, the value of the torque at the joint 206 may be accurate (in contrast to providing a load cell near an end of the actuator 204, for example, where a moment or torque may not exist or would be less than actually experienced at the joint 206).

A controller (e.g., computing device or processor) may receive the outputs of the load cell 208 and determine where along the actuator 204 that the force (F) was applied. Thus, instead of only determining that a force was experienced, because the torque applied to the elbow and to the forearm differ, and because the torque at the elbow joint is determined, a location of the force applied can be determined. In this example, the load cell may include or function as a shear beam sensing load cell.

As an example, if a 10 N force is applied at a distance (d) from the load cell 208, as shown in FIG. 2A, the load cell 208 may detect and measure a force applied, and the force creates a moment about the joint 206, which is also detected and measured by the load cell 208. The distance d may be determined as follows:

$$d = \frac{\tau}{F} \quad \text{Equation (1)}$$

Using this relationship, the same amount of force applied closer to the elbow results in the same vertical force sensed, but the moment created is smaller because the force is applied closer to the joint 206, and the values output by the load cell 208 can be used to determine the distance to the joint 206.

In a specific example, using the configuration shown in FIG. 2A, a force applied in Z direction as shown creates a moment about the Y axis at the joint 206, and the force and moment are experienced by the load cell 208 at the joint 206. The load cell 208 is positioned to capture the force information. Values of the detected force are output by the load cell 208 along the X, Y, and Z axes, and values of the torque are also output by the load cell 208 along the X, Y, and Z axes. The distance d can be determined by dividing the moment by force.

The location of the force (F) applied to the actuator 204 may be approximated by determining the calculation shown above, and thus, the location may be an estimated or theoretical location of where the force was applied. The determination location may thus be an approximation that within a threshold error allowance.

Figure 2B:
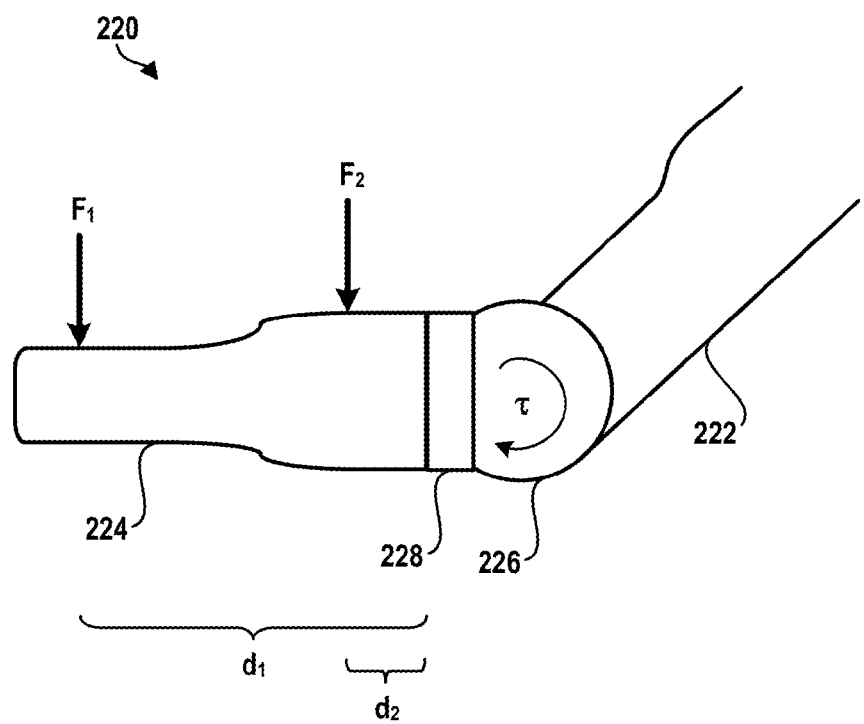

FIG. 2B illustrates another example of force sensing proximal to a joint of multiple actuators of another robotic device 220. The robotic device 220 includes an actuator 222 coupled to another actuator 224 through a joint 226. A load cell 228 is provided proximal to the joint 226, such as between the joint 226 and the actuator 222, for example. In this example, the robotic device 220 may be in the form of a robotic arm, and the joint 226 may be an elbow. The load cell 228 may be provided where the forearm connects to the elbow. The load cell 228 may be configured to detect a force (F) applied to the actuator 224.

In the example shown in FIG. 2B, a first force, $F_1$, may be applied to the actuator 224 at the location shown, and the load cell 228 senses the value of $F_1$. The moment is also sensed by the load cell 226. Using Equation (1) above, $d_1$ (the distance from the location of the detected force to the load cell 228) is $$\frac{\tau}{F_1}.$$

Similarly, a second force, $F_2$, may be applied to the actuator 224 at the location shown, and the load cell 228 senses the value of $F_2$. The moment is also sensed by the load cell 226. Using Equation (1) above, $d_2$ (the distance from the location of the detected force to the load cell 228) is $$\frac{\tau}{F_2}.$$

If $F_1 = F_2$, where the magnitude is the same but an applied location is different, then $$\frac{\tau_2}{d_2} = \frac{\tau_1}{d_1},$$

and thus, $$\tau_2 = \tau_1 \left(\frac{d_2}{d_1}\right).$$

Thus, since the moment is also sensed by the load cell 228, the forces position can be calculated by Equation (1) since the moment values are different as shown above.

In some examples, the location of the detected force along the robotic manipulator is determined with respect to the shear beam sensing load cell. In one instance, the location of the detected force along the robotic manipulator as a distance away from the shear beam sensing load cell, as shown in FIGS. 2A-2B.

In further examples, the controller may further receive information indicating parameters of the actuator 204 and of a load being experienced by the robotic device 200, and based on the force applied to the actuator 204 or the torque experienced about the joint 206 being above a threshold expected amount due to the load being experienced, determine that the actuator 204 is experiencing an unexpected shear load at the location (d). In this example, the parameters of the actuator 204 include length, weight, dimensions, etc., and parameters of the load include similar length, weight, dimensions, etc. The parameters may be input by a user, or received or determined by outputs from other sensors (such as a camera). In this regard, when the controller determines that the actuator is handling a load of 5 lbs at an end of the actuator 204, for example, expected amounts of forces applied to the actuator and torques to be experienced at the joint 206 can be determined. When outputs of the load cell 208 are above the expected amounts of forces and torques, the excess force detected by the load cell 208 may be determined to be due to an unexpected shear load applied at a distance d, as shown in FIGS. 2A-2B.

In still further examples, the robotic devices 200 and 220 may include a sensor 210 to determine an angle (Θ) between the actuator 202 and the actuator 204. The controller may be further programmable to determine a direction of the detected force (F) applied to the actuator 204 based on the angle (Θ) between the actuator 202 and the actuator 204.

Figure 2C:
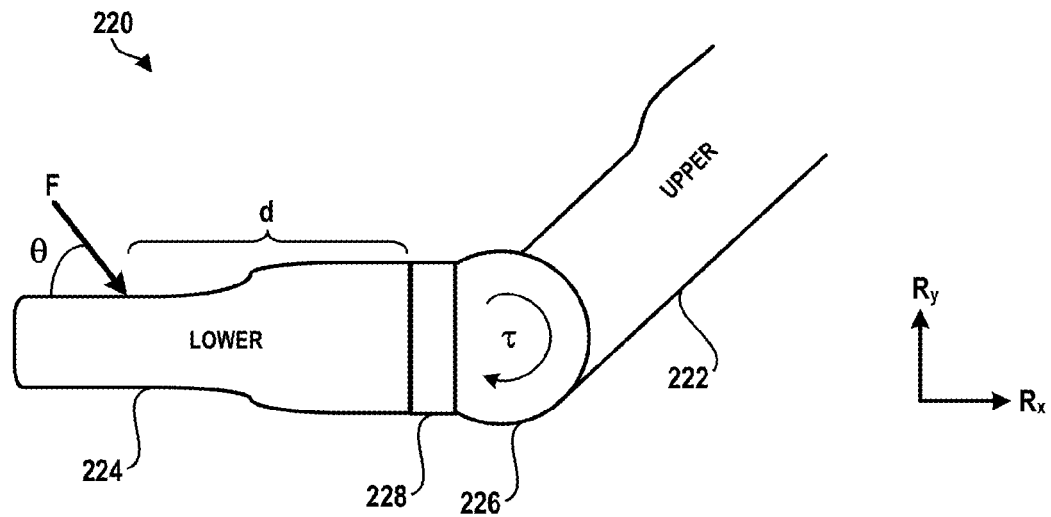

In other examples, as shown in FIG. 2C, the angle (Θ) between the applied force (F) and the actuator 224 can be calculated. The load cell 228 can detect signals $R_x$, $R_y$, and $\tau$ based on the applied force (F). The angle (Θ) can be calculated as follows:

$$\tau = Fd \sin \theta \quad \text{Equation (2)}$$

$$R_y = F \sin \theta \quad \text{Equation (3)}$$

Therefore, $$d = \frac{\tau}{R_y}. \quad \text{Equation (4)}$$

Furthermore, by Pythagorean's theorem, $$F = \sqrt{(R_x^2 + R_y^2)}.$$

Substituting into Equation (2) above yields:

$$\tau = \sqrt{(R_x^2 + R_y^2)} \left(\frac{\tau}{R_y}\right) \sin \theta \quad \text{Equation (5)}$$

which can be solved for the angle (Θ):

$$\theta = \sin^{-1}\left(\frac{R_y}{\sqrt{(R_x^2 + R_y^2)}}\right) \quad \text{Equation (6)}$$

Thus, the magnitude, orientation, and location of the force application to the link can be found with data output from the calibrated load cell, for example.

Figure 3:
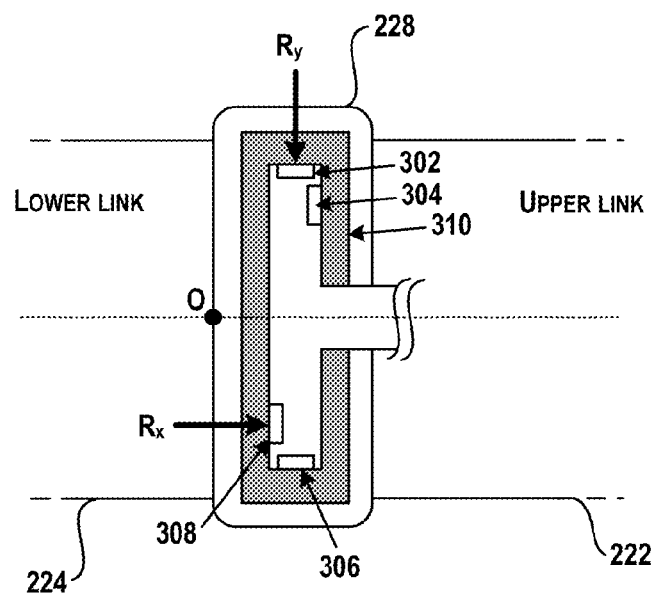
FIG. 3 illustrates a magnified view of a portion of the example robotic device of FIG. 2C.

FIG. 3 illustrates a magnified view of a portion of the example robotic device 220 of FIG. 2C. In FIG. 3, the load cell 228 is shown to include four strain gauges 302, 304, 306, and 308 provided on different sides of the load cell 220. The load cell 220 further includes a compartment 310 surrounding the strain gauges 302, 304, 306, and 308 that may include urethane rubber or another material for dampening forces experienced by the load cell 220.

The strain gauges 302, 304, 306, and 308 may deform, stretch, or contract when a force is applied. Values of the changes are small and are relational to a stress and/or strain that the load cell 220 is undergoing at the time. A change in resistance of the strain gauges 302, 304, 306, and 308 is converted into an electrical value that is calibrated to a load placed on the load cell 220. As shown in FIG. 3, the strain gauges 302, 304, 306, and 308 may receive forces along various axes causing a resistance change relating to a force received along the X axis ($R_x$) or a resistance change relating to a force received along the Y axis ($R_y$), for example.

In other examples, other types of load cells may be used as well, such as piezoelectric, hydraulic (or hydrostatic), barometric, and semiconductor load cells. By example, a hydraulic load cell may be utilized in instances where transient voltages are expected and are undesirable to effect outputs. Piezoelectric load cells function similarly to strain gauge load cells, but a voltage output is generated by a piezo material proportional to deformation of the load cell. And barometric load cells detect forces due to pressure changes interior in the load cell, which may include a MEMS device to measure pressure within a given force-sensing range, for example.

Figure 4:
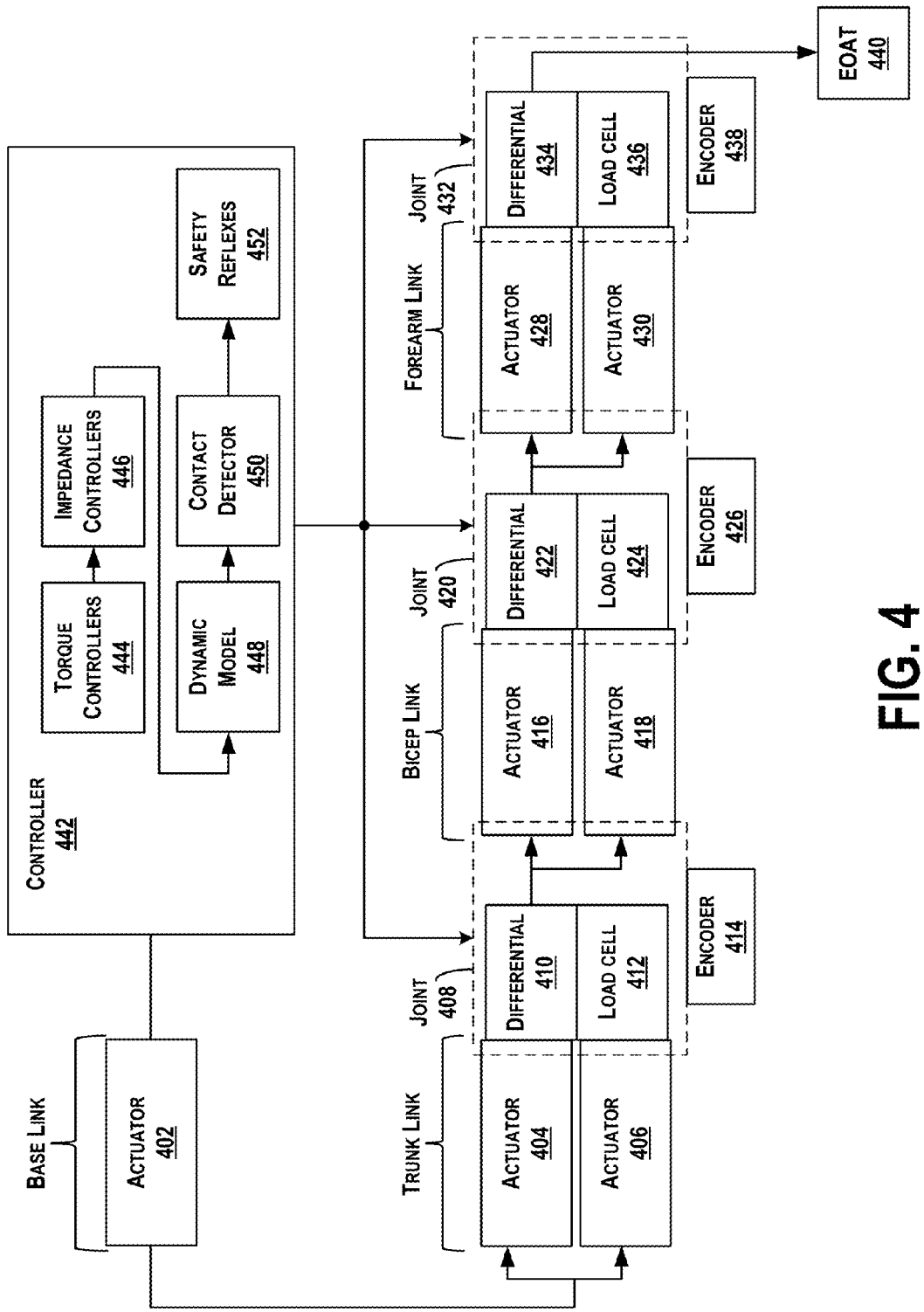
FIG. 4 is a block diagram illustrating an example system for control of a robotic device.

FIG. 4 is a block diagram illustrating an example system for control of a robotic device. The system includes a base link comprising a single actuator 402, coupled to a trunk link comprising side-by-side actuators 404 and 406 coupled to a joint 408. The joint 408 includes a differential 408, a load cell 412, and an encoder 414. The load cell 412 detects a force applied to the trunk link a torque experienced about the joint 408, for example. The encoder 412 may determine an angle of the differential 410 as between the trunk link and a connecting link (e.g., bicep link).

The differential 408 connects to a bicep link that comprises side-by-side actuators 416 and 418 coupled to a joint 420. The joint 420 includes a differential 422, a load cell 424, and an encoder 426. The load cell 424 detects a force applied to the bicep link and a torque experienced about the joint 420, for example. The encoder 426 may determine an angle of the differential 422 as between the bicep link and a connecting link (e.g., forearm link).

The differential 422 connect to a forearm link that comprises actuators 428 and 430 coupled to a joint 432. The joint includes a differential 434, a load cell 436, and an encoder 438. The load cell 436 detects a force applied to the forearm link and a torque experienced about the joint 432, for example. The encoder 438 may determine an angle of the differential 434 as between the forearm link and a connecting link (e.g., EOAT).

The differential 434 outputs to end-of-arm-tooling (EOAT) 440. Thus, the base link, trunk link, bicep link, and forearm link may be modular links coupled to form a seven degree-of-freedom (DOF) robotic arm.

The system may also include a controller 442 coupled to the base link, the trunk link, the bicep link, and the forearm link (or coupled to components of such links) to handle control at a deterministic rate and command desired torques to actuators. The controller 442 may include torque controllers 444, impedance controllers 446, a dynamic control model 448, a contact detector 450, and safety reflexes 452.

The torque controllers 444 and impedance controllers 446 determine motor currents for the actuators of the links based on output torques in a feedback control loop. Other hybrid force-position controllers and position controllers as would be suitable for a robotic arm may be used as well.

The dynamic model 448 may also be used based on measured link inertias, accelerations, and velocities, to compute expected instantaneous torques during a known task.

The contact detector 450 may compare such expectations against measured torques provided by sensors (e.g., load cells 412, 424, and 436), and a difference above a specified threshold can be flagged as unexpected contact with a person, object, or environment.

The safety reflex 452 may adapt control policy to react appropriately to the contact. Reactions may include reversal of torques, locking of motor brakes, changing to a low impedance gravity compensation mode, or modification of the arm trajectory, for example.

As an example, the controller 442 may determine an unexpected shear load is present, and then cause the robotic device to perform a safety function based on the determination of the unexpected shear load, or based on the presence of the unexpected shear load and also based on the location of the detected force. For example, the controller 442 may cause the safety function to be performed based on the location of the detected force being within a threshold distance to a given joint, such as the detected force being within 1 foot or within 2 inches to 1 foot of a joint. In such an example, a load cell may output a detected torque of 100 N/M at an elbow joint, and if the force is 100 N at 1 meter away from the joint, then a safety function may be triggered due to a large force being present in close proximity to the joint. But, if the detected force is determined to be 1 N at 100 meters away from the joint, then a safety function may not be triggered due to the low force far away from the joint.

Within examples, a variety of safety functions may be triggered including any of pausing operation, moving any of the actuators at a slower speed, and/or signaling an alarm. A safety function to perform may be dependent upon a function that the robotic device is performing since in some situations, it may be better to continue operation, and in other situations, it may be better to discontinue operation.

Information output from the load cells 412, 424, and 436 is useful for torque control of the actuators, as well as for determinations of shear forces for safety measures. The robotic device may have information of its own parameters (e.g., payloads, weight and length of actuators) and may determine a load being experienced. When any extra external forces are detected, such forces may be determined to be shear loading due to an object entering a workspace, for example, and the robotic device may then perform a safety function. The controller 442 can calculate where a force is applied on an actuator to trigger shear force control.

Although FIG. 4 illustrates one controller 442, multiple controllers may be provided for each joint to couple to the load cells 412, 424, and 436 for receiving information output from the load cell 412, 424, and 436 to determine locations of forces applied to the device, for example.

Figure 5:
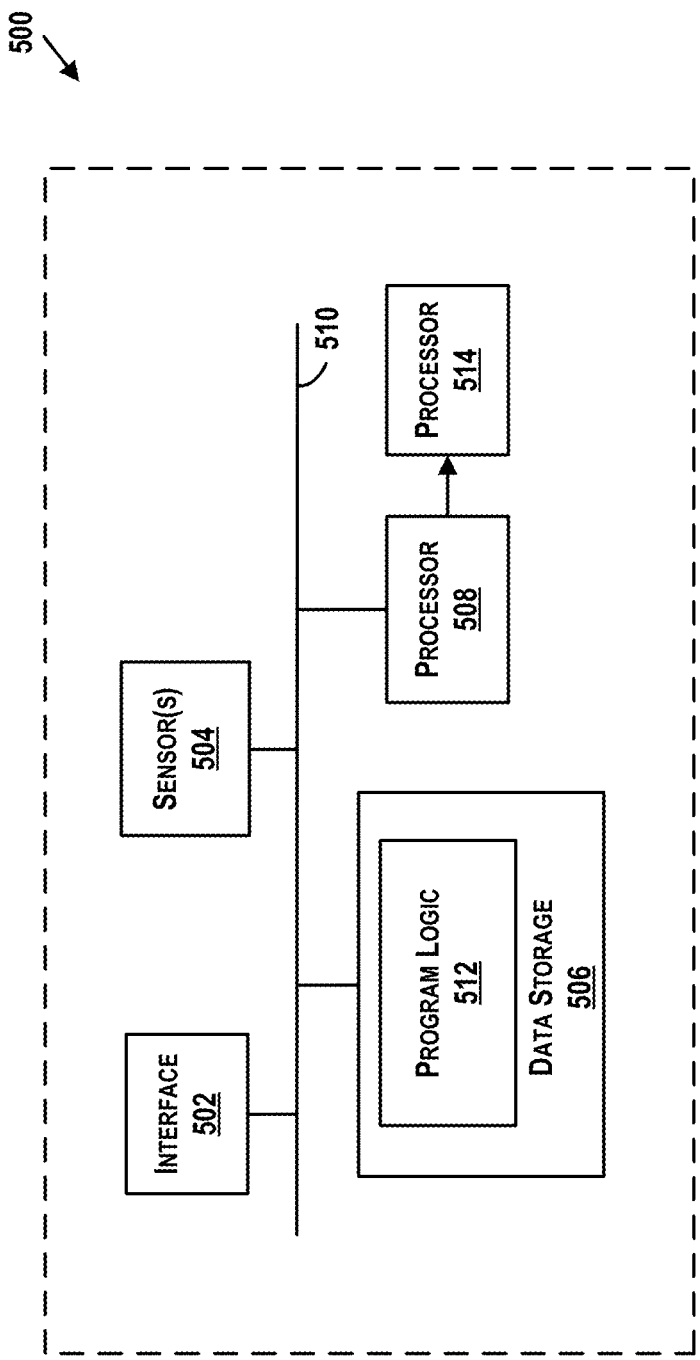
FIG. 5 illustrates a schematic drawing of an example computing device.

The controller 442 may take the form of a computing device, such as illustrated in FIG. 5, which illustrates a schematic drawing of an example computing device 500. In some examples, some components illustrated in FIG. 5 may be distributed across multiple computing devices. However, for the sake of example, the components are shown and described as part of one example device 500. The device 500 may be or include a mobile device, desktop computer, tablet computer, or similar device that may be configured to perform the functions described herein.

The device 500 may include an interface 502, sensor(s) 504, data storage 506, and a processor 508. Components illustrated in FIG. 5 may be linked together by a communication link 510. The communication link 510 is illustrated as a wired connection; however, wireless connections may also be used. The device 500 may also include hardware to enable communication within the device 500 and between the device 500 and other computing devices (not shown), such as a server entity. The hardware may include transmitters, receivers, and antennas, for example.

The interface 502 may be configured to allow the device 500 to communicate with another computing device (not shown), such as a server. Thus, the interface 502 may be configured to receive input data from one or more computing devices, and may also be configured to send output data to the one or more computing devices. The interface 502 may also be configured to receive input from and provide output to an actuator, a modular link of a robot arm, or indicators of a joint of the arm, for example. The interface 502 may include a receiver and transmitter to receive and send data, or may be hard-wired to components to send and receive data. In other examples, the interface 502 may also include a user-interface, such as a keyboard, microphone, touchscreen, etc., to receive inputs as well.

The sensor 504 may include one or more sensors, or may represent one or more sensors included within the device 500. Example sensors include an accelerometer, gyroscope, pedometer, light sensors, microphone, camera, contact rollers, load cells, strain gauges or other context-aware sensors that may collect data of the actuators or joints and provide the data to the data storage 506 or processor 508.

The processor 508 may be configured to receive data from the interface 502, the sensor 504, and the data storage 506. The data storage 506 may store program logic 512 that can be accessed and executed by the processor 508 to perform functions executable to determine instructions for operation of actuators or indicators on joints, for example. Example functions include determination of tension or forces experienced by the actuators or output torque of the joints in the system, and control of the robotic device during periods of shear force loading. Any functions described herein, or other example functions for the robotic device may be performed by the device 500 or one or more processors 508 of the device via execution of instructions stored on the data storage 506 or otherwise received.

The device 500 is illustrated to include an additional processor 514. The processor 514 may be configured to control other aspects of the device 500 including displays or outputs of the device 500 (e.g., the processor 514 may be a GPU). Example methods described herein may be performed individually by components of the device 500, or in combination by one or all of the components of the device 500. In one instance, portions of the device 500 may process data and provide an output internally in the device 500 to the processor 514, for example. In other instances, portions of the device 500 may process data and provide outputs externally to other computing devices.

Within some examples herein, operations may be described as methods for performing functions, and methods may be embodied on a computer program product (e.g., a tangible computer readable storage medium or non-transitory computer readable medium) that includes instructions executable to perform the functions.

Figure 6:
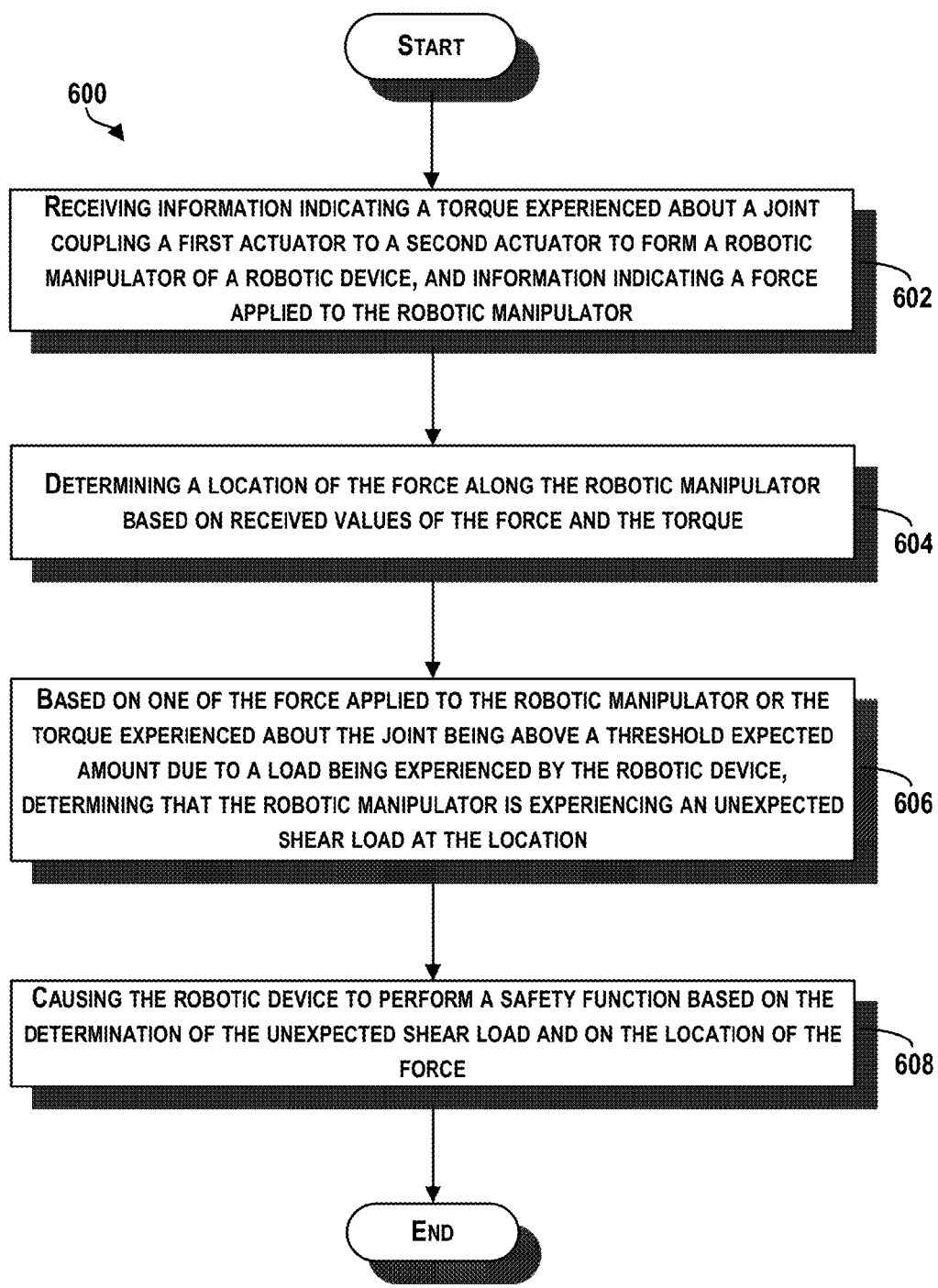
FIG. 6 is a flowchart illustrating an example method for operating a robotic device.

FIG. 6 is a flowchart illustrating an example method 600 for operating a robotic device. The method 600 may be embodied as computer executable instructions stored on non-transitory media, for example, that may be executed by a device or by one or more processors. At block 602, the method 600 includes receiving information indicating a torque experienced about a joint coupling a first actuator to a second actuator to form a robotic manipulator of a robotic device, and information indicating a force applied to the robotic manipulator. The information may indicate values of the force and the torque along all three Cartesian coordinate axes X, Y, and Z. The information may be received from a load cell provided proximal to the joint, for example.

At block 604, the method 600 includes determining a location of the force along the robotic manipulator based on received values of the force and the torque. The location of the force along the robotic manipulator may be determined as a distance away from the load cell, for example.

At block 606, the method 600 includes based on one of the force applied to the robotic manipulator or the torque experienced about the joint being above a threshold expected amount due to a load being experienced by the robotic device, determining that the robotic manipulator is experiencing an unexpected shear load at the location.

At block 608, the method 600 includes causing the robotic device to perform a safety function based on the determination of the unexpected shear load and on the location of the force.

The method 600 may also include causing the robotic device to perform the safety function based on the determination of the unexpected shear load and on the location of the detected force being within a threshold distance to the joint. The safety function may include one of pausing operation, moving the one or more actuators at a slower speed, and signaling an alarm.

In further examples, the method 600 may include determining an angle between the first actuator and the second actuator, and determining a direction of the force applied to the robotic manipulator based on the angle between the first actuator and the second actuator.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A robotic device comprising:
    one or more actuators coupled through one or more joints to form a robotic manipulator;
    a shear beam sensing load cell provided proximal to a given joint of the one or more joints for detecting a force applied to the robotic manipulator and a torque experienced about the given joint; and
    a controller programmable to:
        determine a location of the detected force along the robotic manipulator based on values of the force and the torque output from the shear beam sensing load cell and wherein the location of the detected force is determined as a distance away from the shear beam sensing load cell;
        receive information indicating parameters of the robotic manipulator and of a load being experienced by the robotic device; and
        based on one of the force applied to the robotic manipulator or the torque experienced about the given joint being above a threshold expected amount due to the load being experienced, determine that the robotic manipulator is experiencing an unexpected shear load at the location.

2. The robotic device of claim 1, wherein the controller is further programmable to cause the robotic device to perform a safety function based on the determination of the unexpected shear load and on the location of the detected force.

3. The robotic device of claim 1, wherein the controller is further programmable to cause the robotic device to perform a safety function based on the determination of the unexpected shear load and on the location of the detected force being within a threshold distance to the given joint.

4. The robotic device of claim 1, wherein the controller is further programmable to cause the robotic device to perform a safety function based on the determination of the unexpected shear load.

5. The robotic device of claim 4, wherein the safety function includes one of pausing operation, moving the one or more actuators at a slower speed, and signaling an alarm.

6. The robotic device of claim 1, wherein the shear beam sensing load cell includes a load cell that outputs the values of the force and the torque along all three Cartesian coordinate axes X, Y, and Z.

7. The robotic device of claim 1, wherein the controller is further programmable to determine the location of the detected force along the robotic manipulator with respect to the shear beam sensing load cell.

8. The robotic device of claim 1, wherein the robotic manipulator comprises a first actuator coupled to a second actuator through a joint, and wherein the robotic device further comprises:
    a sensor to determine an angle between the first actuator and the second actuator; and
    wherein the controller is programmable to determine a direction of the force applied to the robotic manipulator based on the angle between the first actuator and the second actuator.

9. A robotic device comprising:
    a first actuator coupled to a second actuator through a joint to form a robotic manipulator;
    a load cell provided at the joint for detecting a force applied to the robotic manipulator and a torque experienced about the joint;
    a sensor to determine an angle between the first actuator and the second actuator; and
    a controller programmable to:
        determine a location of the detected force along the robotic manipulator based on values of the force and the torque output from the load cell and wherein the location of the detected force is determined as a distance away from the load cell; and
        determine a direction of the detected force applied to the robotic manipulator based on the angle between the first actuator and the second actuator.

10. The robotic device of claim 9, wherein the controller is further programmable to, based on one of the force applied to the robotic manipulator or the torque experienced about the joint being above a threshold expected amount due to a load being experienced by the robotic device, determine that the robotic manipulator is experiencing an unexpected shear load at the location.

11. The robotic device of claim 10, wherein the controller is further programmable to cause the robotic device to perform a safety function based on the determination of the unexpected shear load and on the location of the detected force.

12. The robotic device of claim 9, wherein the load cell outputs the values of the force and the torque along all three Cartesian coordinate axes X, Y, and Z.

13. A method comprising:
 receiving information indicating a torque experienced about a joint coupling a first actuator to a second actuator to form a robotic manipulator of a robotic device, and information indicating a force applied to the robotic manipulator;
 determining a location of the force along the robotic manipulator based on received values of the force and the torque;
 based on one of the force applied to the robotic manipulator or the torque experienced about the joint being above a threshold expected amount due to a load being experienced by the robotic device, determining that the robotic manipulator is experiencing an unexpected shear load at the location; and
 causing the robotic device to perform a safety function based on the determination of the unexpected shear load and on the location of the force being within a threshold distance to the joint.

14. The method of claim 13, wherein the safety function includes one of pausing operation, moving the one or more actuators at a slower speed, and signaling an alarm.

15. The method of claim 13, wherein receiving information indicating a torque experienced about a joint coupling a first actuator to a second actuator to form a robotic manipulator of a robotic device, and information indicating a force applied to the robotic manipulator comprises:
 receiving information indicating values of the force and the torque along all three Cartesian coordinate axes X, Y, and Z.

16. The method of claim 13, wherein receiving information indicating a torque experienced about a joint coupling a first actuator to a second actuator to form a robotic manipulator of a robotic device, and information indicating a force applied to the robotic manipulator comprises receiving the information from a load cell provided proximal to the joint, and the method further comprises:
 determining the location of the force along the robotic manipulator as a distance away from the load cell.

17. The method of claim 13, further comprising:
 determining an angle between the first actuator and the second actuator; and
 determining a direction of the force applied to the robotic manipulator based on the angle between the first actuator and the second actuator.

* * * * *